United States Patent
Okada et al.

(10) Patent No.: US 11,341,991 B1
(45) Date of Patent: May 24, 2022

(54) DISK DEVICE WITH MAGNETIC HEAD

(71) Applicants: Kabushiki Kaisha Toshiba, Tokyo (JP); Toshiba Electronic Devices & Storage Corporation, Tokyo (JP)

(72) Inventors: Mio Okada, Yokohama Kanagawa (JP); Toru Watanabe, Kawasaki Kanagawa (JP); Masami Yamane, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/377,920

(22) Filed: Jul. 16, 2021

(30) Foreign Application Priority Data

Jan. 15, 2021 (JP) .............................. JP2021-005032

(51) Int. Cl.
*G11B 5/31* (2006.01)

(52) U.S. Cl.
CPC ................................. *G11B 5/3136* (2013.01)

(58) Field of Classification Search
None
See application file for complete search history.

(56) References Cited

U.S. PATENT DOCUMENTS

| | | | | |
|---|---|---|---|---|
| 7,400,473 B1* | 7/2008 | Krajnovich | .......... | G11B 5/3136 |
| | | | | 360/294.7 |
| 7,480,115 B2 | 1/2009 | Hiroyuki et al. | | |
| 7,990,647 B2 | 8/2011 | Lille | | |
| 8,724,263 B2 | 5/2014 | Hutchinson et al. | | |
| 8,773,801 B2 | 7/2014 | Kurita et al. | | |
| 9,208,811 B1* | 12/2015 | Kim | .................... | G11B 5/6076 |
| 10,867,624 B1* | 12/2020 | Watanabe | ............ | G11B 5/3136 |
| 2007/0053103 A1* | 3/2007 | Satoh | ................... | G11B 5/6064 |
| | | | | 360/128 |
| 2009/0251828 A1* | 10/2009 | Schreck | ................ | B82Y 25/00 |
| | | | | 360/319 |
| 2010/0128383 A1* | 5/2010 | Matsushita | .......... | G11B 5/6029 |
| | | | | 360/75 |
| 2014/0268386 A1* | 9/2014 | Li | .......................... | G11B 5/607 |
| | | | | 360/31 |

* cited by examiner

*Primary Examiner* — William J Klimowicz
(74) *Attorney, Agent, or Firm* — Knobbe, Martens, Olson & Bear, LLP

(57) ABSTRACT

According to one embodiment, a disk device includes a housing, a temperature sensor in the housing, a magnetic disk in the housing, a magnetic head disposed in the housing to be movable in a radial direction of the magnetic disk, the magnetic head including a write head, a read head, a first thermal actuator, and a second thermal actuator, a power supply circuit which supplies first power to the first thermal actuator and supplies second power to the second thermal actuator, and a controller configured to adjust a power ratio between the first power and the second power, based on at least one of a change in temperature inside the housing and a change in a radial position of the magnetic head in the radial direction.

4 Claims, 18 Drawing Sheets

| PR | Zn:31 | ... | Zn:24 | ... | Zn:16 | ... | Zn:7 | ... | Zn:0 |
|---|---|---|---|---|---|---|---|---|---|
| 5°C | 42% | ... | 45% | ... | 48% | ... | 51% | ... | 54% |
| ⋮ | ⋮ | ⋮ | ⋮ | ⋮ | ⋮ | ⋮ | ⋮ | ⋮ | ⋮ |
| 25°C | 25% | ... | 30% | ... | 35% | ... | 40% | ... | 45% |
| ⋮ | ⋮ | ⋮ | ⋮ | ⋮ | ⋮ | ⋮ | ⋮ | ⋮ | ⋮ |
| 55°C | 15% | ... | 17% | ... | 20% | ... | 27% | ... | 35% |
| ⋮ | ⋮ | ⋮ | ⋮ | ⋮ | ⋮ | ⋮ | ⋮ | ⋮ | ⋮ |
| 70°C | 5% | ... | 7% | ... | 10% | ... | 17% | ... | 25% |

Power ratio setting table 1

FIG. 14

| PR | Zn:31 | ... | Zn:24 | ... | Zn:16 | ... | Zn:7 | ... | Zn:0 |
|---|---|---|---|---|---|---|---|---|---|
| Hd:0 | 5°C | 42% | ... | 45% | ... | 48% | ... | 51% | ... | 54% |
| | ... | ... | ... | ... | ... | ... | ... | ... | ... | ... |
| | 25°C | 25% | ... | 30% | ... | 35% | ... | 40% | ... | 45% |
| | ... | ... | ... | ... | ... | ... | ... | ... | ... | ... |
| | 55°C | 15% | ... | 17% | ... | 20% | ... | 27% | ... | 35% |
| | ... | ... | ... | ... | ... | ... | ... | ... | ... | ... |
| | 70°C | 5% | ... | 7% | ... | 10% | ... | 17% | ... | 25% |
| Hd:1 | 5°C | 41% | ... | 44% | ... | 47% | ... | 50% | ... | 53% |
| | ... | ... | ... | ... | ... | ... | ... | ... | ... | ... |
| | 25°C | 24% | ... | 29% | ... | 34% | ... | 39% | ... | 44% |
| | ... | ... | ... | ... | ... | ... | ... | ... | ... | ... |
| | 55°C | 14% | ... | 16% | ... | 19% | ... | 26% | ... | 34% |
| | ... | ... | ... | ... | ... | ... | ... | ... | ... | ... |
| | 70°C | 4% | ... | 6% | ... | 9% | ... | 16% | ... | 24% |
| ...... | 5°C | 43% | ... | 46% | ... | 49% | ... | 52% | ... | 55% |
| | ... | ... | ... | ... | ... | ... | ... | ... | ... | ... |

Power ratio setting table 2

FIG. 22

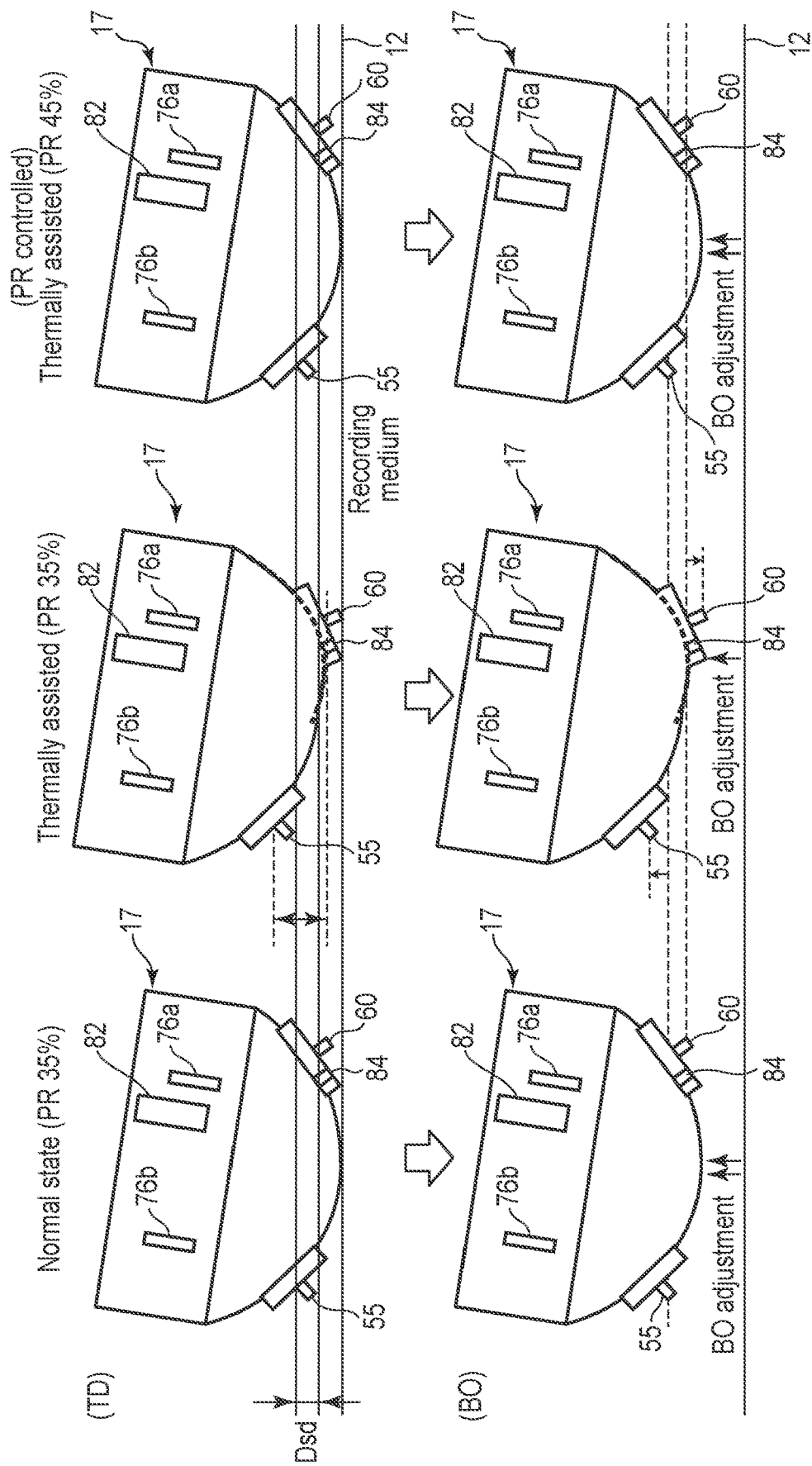

DISK DEVICE WITH MAGNETIC HEAD

CROSS-REFERENCE TO RELATED APPLICATIONS

This application is based upon and claims the benefit of priority from Japanese Patent Application No. 2021-005032, filed Jan. 15, 2021, the entire contents of which are incorporated herein by reference.

FIELD

Embodiments described herein relate generally to a disk device.

BACKGROUND

As a disk device, for example, a magnetic disk device comprises a rotatable disk-shaped recording medium having a magnetic recording layer, and a magnetic head that reads and writes data from and in the magnetic recording layer of the recording medium. The magnetic head includes a slider; and a read head (read element) and a write head (write element) provided on the slider. In such a magnetic disk device, in order to improve a recording density, particularly a linear recording density, it is necessary to reduce a gap between the read head and the recording medium and between the recording head and the recording medium.

In order to reduce the above-described gap, there is proposed a magnetic disk device including a thermal actuator embedded in a slider in the vicinity of a read head and a recording head. In this magnetic disk device, it is possible to reduce the above-described gap by causing a part of the slider to bulge, the read head, and the recording head toward the surface side of the recording medium by the thermal actuator.

However, in the above magnetic disk device, since a shape of the bulge of the head element portion depends on an ambient temperature, the gap (flying height) between the head element portion and the recording medium changes. Since a flying pitch of the magnetic head depends on not only an influence of temperature but also a radial position on a storage medium, there is a possibility that the above-described gap (flying height) changes.

When the flying height (spacing amount) changes, it becomes difficult to obtain a desired recording density, and there is a possibility that the head element comes into contact with the recording medium and suffers damage such as wear.

BRIEF DESCRIPTION OF THE DRAWINGS

FIG. 14 is a diagram illustrating an example of a power ratio setting table.

FIG. 22 is a diagram illustrating another example of the power ratio setting table.

FIGS. 29A, 29B, and 29C are side views each schematically illustrating a touch down (TD) operation and a flying height adjustment operation (BO) of the magnetic head during a write operation.

DETAILED DESCRIPTION

Figure 1:
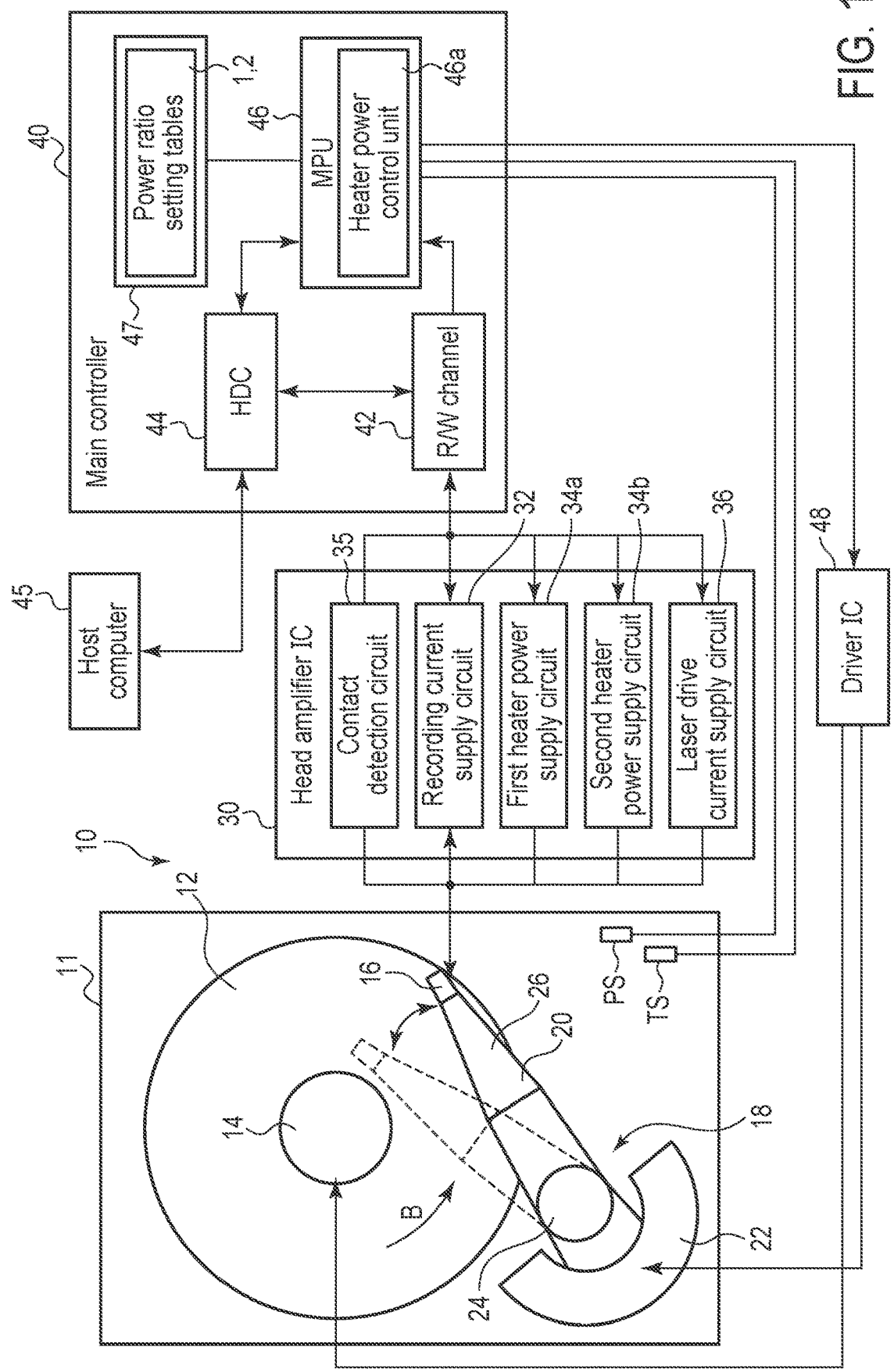
FIG. 1 is a block diagram schematically illustrating a hard disk drive (HDD) according to a first embodiment.

Various embodiments will be described hereinafter with reference to the accompanying drawings. In general, according to one embodiment, a disk device comprises: a housing; a temperature sensor which detects a temperature in the housing; a magnetic disk rotatably provided in the housing; a magnetic head disposed in the housing to be movable in a radial direction of the magnetic disk, the magnetic head comprising: a write head that writes data on the magnetic disk, a read head that reads data on the magnetic disk, a first thermal actuator that controls an amount of protrusion of the write head, and a second thermal actuator that controls an amount of protrusion of the read head; a power supply circuit which supplies first power to the first thermal actuator and supplies second power to the second thermal actuator; and a controller configured to adjust a power ratio between the first power and the second power, based on at least one of a change in temperature inside the housing and a change in a radial position of the magnetic head in the radial direction with respect to the magnetic disk.

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by the same reference numbers, and detailed description thereof is omitted unless necessary.

First Embodiment

Figure 2:
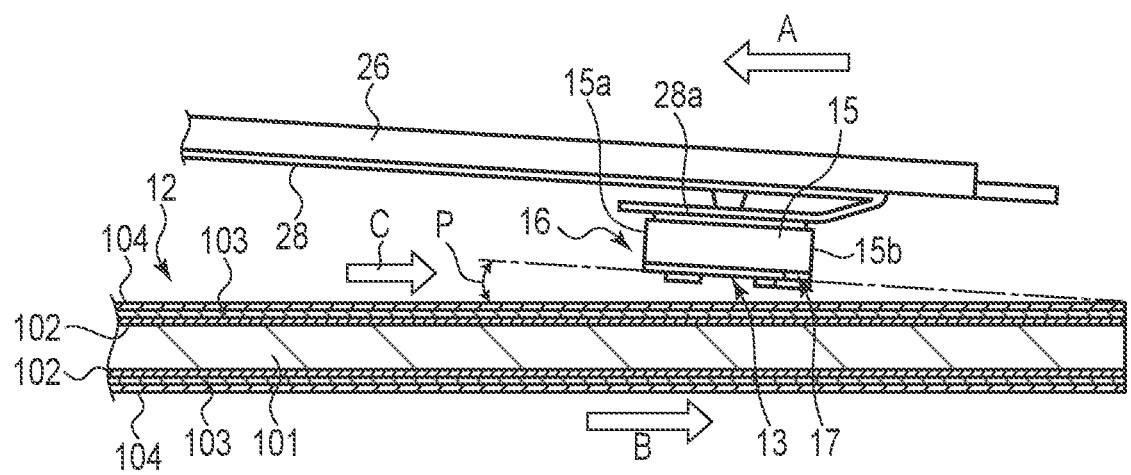
FIG. 2 is a side view schematically illustrating a magnetic head, a suspension, and a magnetic disk in the HDD.

A hard disk drive (HDD) according to a first embodiment will be described in detail as an example of the disk device. FIG. 1 is a block diagram schematically illustrating an HDD according to a first embodiment, and FIG. 2 is a side view illustrating a magnetic head during flying and a magnetic disk.

As illustrated in FIG. 1, an HDD 10 includes a rectangular housing 11, a magnetic disk 12 as a recording medium disposed in the housing 11, a spindle motor 14 that supports and rotates the magnetic disk 12, and a plurality of magnetic heads 16 that record (write) and reproduce (read) data on the magnetic disk 12. The HDD 10 includes a head actuator 18 that moves and positions magnetic heads 16 on arbitrary tracks on the magnetic disk 12. The head actuator 18 includes: a carriage assembly 20 that movably support magnetic heads 16; and a voice coil motor (VCM) 22 that rotates the carriage assembly 20. In the housing 11, there are provided a temperature sensor TS and a pressure sensor PS that respectively detect a temperature and a pressure in the housing 11.

The HDD 10 includes: a head amplifier IC 30 that drives the magnetic head 16; a main controller 40; and a driver IC 48. The head amplifier IC 30 is provided on, for example, the carriage assembly 20 and is electrically connected to the magnetic head 16. The head amplifier IC 30 includes a recording current supply circuit (recording current supply unit) 32 that supplies a recording current to a recording coil of the magnetic head 16, a first heater power supply circuit 34a and a second heater power supply circuit 34b that supply drive power to a thermal actuator (heater) of the magnetic head 16 to be described later, an amplifier (not illustrated) that amplifies a signal read by the magnetic head 16, and the like. The head amplifier IC 30 further includes a contact detection circuit 35 that detects a detection signal of a contact sensor (CS) to be described later, and a laser drive current supply circuit 36 that supplies a drive current to a laser oscillator for thermal assist to be described later.

The main controller 40 and the driver IC 48 are configured, for example, on a control circuit board (not illustrated) provided on a back side of the housing 11. The main controller 40 includes an R/W channel 42, a hard disk controller (HDC) 44, a microprocessor (MPU) 46, a memory 47, and the like. The main controller 40 is electrically connected to the magnetic head 16 via the head amplifier IC 30. The main controller 40 is electrically connected to the VCM 22 and the spindle motor 14 via the driver IC 48. The HDC 44 can be connected to a host computer 45.

The memory 47 of the main controller 40 stores various data such as a power ratio setting table to be described later. Regarding the main controller 40, for example, the MPU 46 includes a heater power control unit 46a that adjusts power to be supplied to the thermal actuator, based on the power ratio setting table. The temperature sensor TS and the pressure sensor PS are electrically connected to the main controller 40, and send a detected temperature and a detected pressure to the heater power control unit 46a.

As illustrated in FIGS. 1 and 2, the magnetic disk 12 is configured as a perpendicular magnetic recording medium. The magnetic disk 12 includes, for example, a substrate 101 formed of a non-magnetic material and formed in a disk shape having a diameter of 96 mm (about 3.5 inches). On each surface of the substrate 101 there are serially laminated: a soft magnetic layer 102 formed of a material exhibiting soft magnetic characteristics as an underlayer; a perpendicular magnetic recording layer 103 having magnetic anisotropy in a direction perpendicular to a surface of the magnetic disk 12; and a protective film 104. The magnetic disk 12 is coaxially fitted to a hub of the spindle motor 14. The magnetic disk 12 is rotated in a direction of arrow B at a predetermined speed by the spindle motor 14.

The carriage assembly 20 includes a bearing portion 24 rotatably supported by the housing 11, and a plurality of arms and suspensions 26 extending from the bearing portion 24. As illustrated in FIG. 2, the magnetic heads 16 are supported on extending ends of respective suspension 26. The magnetic head 16 is electrically connected to the head amplifier IC 30 via a wiring member (flexure) 28 provided on the carriage assembly 20.

As illustrated in FIG. 2, the magnetic head 16 is configured as a flying head and includes: a slider 15 formed in a substantially rectangular parallelepiped shape; and a head portion 17 formed at an end part of the slider 15 on an outflow end (trailing) side. The slider 15 is formed of, for example, a sintered body (AlTiC) of alumina and titanium carbide, and the head portion 17 is made of a plurality of thin films. The slider 15 is attached to a gimbal portion 28a of the wiring member 28.

The slider 15 has a disk facing surface (air bearing surface (ABS)) 13 in a substantially rectangular shape facing the surface of the magnetic disk 12. The slider 15 is kept flying above the surface of the magnetic disk 12 by a predetermined amount by an air flow C generated between the disk surface and the ABS 13 by a rotation of the magnetic disk 12. A direction of the air flow C coincides with a rotation direction B of the magnetic disk 12. The slider 15 has a leading end 15a located on an inflow side of the air flow C and a trailing end 15b located on an outflow side of the air flow C. With the rotation of the magnetic disk 12, the magnetic head 16 travels in a direction of arrow A (head traveling direction) with respect to the magnetic disk 12, that is, in a direction opposite to the rotation direction B of the disk.

In a state where the magnetic head 16 is flying, the ABS 13 of the slider 15 is inclined by a flying pitch (flying pitch angle) P with respect to the surface of the magnetic disk 12.

Figure 3:
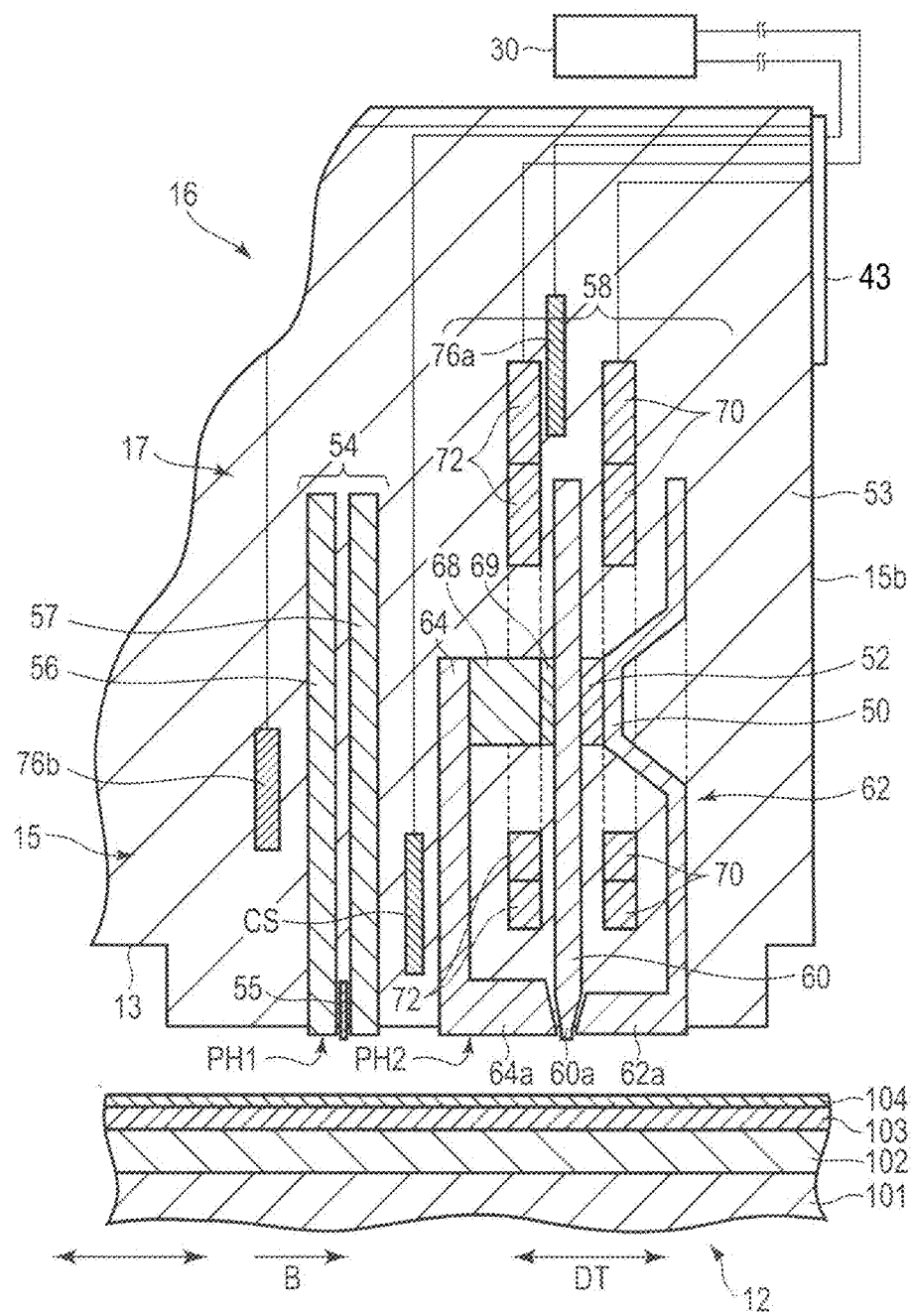
FIG. 3 is an enlarged cross-sectional view illustrating a head portion of the magnetic head.

FIG. 3 is an enlarged cross-sectional view illustrating parts of the head portion 17 of the magnetic head 16 and the magnetic disk 12.

As illustrated in FIG. 3, the head portion 17 includes a read head (read element) 54 and a write head (write element) 58 formed by a thin film process, and is formed as a separation type magnetic head. The read head 54 and the write head 58 are covered with a nonmagnetic protective insulating film 53 except for parts exposed from the ABS 13 of the slider 15. The protective insulating film 53 constitutes an outer shape of the head portion 17. The head portion 17 includes a first thermal actuator that controls a protrusion amount of the write head 58 and a second thermal actuator that controls a protrusion amount of the read head 54. The first thermal actuator includes, for example, a heater 76a, and the heater 76a is embedded in the protective insulating film 53 and located in the vicinity of the write head 58. The second actuator includes, for example, a heater 76b, and the heater 76b is embedded in the protective insulating film 53 and located in the vicinity of the read head 54.

The head portion 17 further includes a contact sensor CS. The contact sensor CS is embedded in the protective insulating film 53 and is disposed in the vicinity of the ABS 13 between the read head 54 and the write head 58. The contact sensor CS is, for example, a resistance detection type thermal contact sensor, is energized from the main controller 40, and can send a detection signal to the main controller 40.

A longitudinal direction of a recording track formed in the perpendicular magnetic recording layer 103 of the magnetic disk 12 is defined as a down track direction DT, and a width direction, of the recording track, orthogonal to the longitudinal direction is defined as a cross track direction.

The read head 54 includes: a magnetoresistive effect element (in some cases, referred to as a read element) 55; and a first magnetic shield film 56 and a second magnetic shield film 57 which are respectively disposed on a leading side (inflow side) and a trailing side (outflow side) of the magnetoresistive effect element 55 so as to sandwich the magnetoresistive effect element 55 therebetween in the down track direction DT. The magnetoresistive effect element 55 and the first and second magnetic shield films 56 and 57 extend substantially perpendicular to the ABS 13. Lower end portions (tip end parts) of the magnetoresistive effect element 55 and the first and second magnetic shield films 56 and 57 slightly protrude from the ABS 13 to constitute a first protrusion HP1. In the first protrusion HP1, the protrusion amount of a tip end part of the magnetoresistive effect element 55 is larger than protrusion amounts of tip end parts of the first and second magnetic shield films 56 and 57, and the tip end part of the magnetoresistive effect element 55 therefore protrudes beyond the first and second magnetic shield films.

The write head 58 is provided on the trailing end 15b side of the slider 15 with respect to the read head 54. The write head 58 includes: a main magnetic pole 60 that generates a recording magnetic field in a direction perpendicular to the surface of the magnetic disk 12; a trailing shield (first shield) 62 provided on a trailing side of the main magnetic pole 60 to face the main magnetic pole 60 with a write gap; a leading shield (second shield) 64 facing a leading side of the main magnetic pole 60; and a pair of side shields (not illustrated) formed integrally with the trailing shield 62 and provided on both sides of the main magnetic pole 60 in the cross track direction. The main magnetic pole 60 and the trailing shield 62 constitute a first magnetic core forming a magnetic path, and the main magnetic pole 60 and the leading shield 64 constitute a second magnetic core forming a magnetic path. The write head 58 includes a first recording coil 70 wound around the first magnetic core and a second recording coil 72 wound around the second magnetic core. In the following description, the main magnetic pole 60 may be referred to as a write element in some cases.

The main magnetic pole 60 is formed of a soft magnetic material having a high magnetic permeability and a high saturation magnetic flux density, and extends substantially perpendicular to the ABS 13. A tip end portion 60a of the main magnetic pole 60 on the ABS 13 side is tapered toward the ABS 13, and is formed in a columnar shape having a narrower width than the other part. The tip end portion 60a of the main magnetic pole 60 slightly protrudes from the ABS 13 of the slider 15.

The trailing shield 62 is formed of a soft magnetic material, and is provided to efficiently close the magnetic path via the soft magnetic layer 102 of the magnetic disk 12 immediately below the main magnetic pole 60. The trailing shield 62 is formed in a substantially L shape, and a tip end portion 62a of the trailing shield 62 is formed in an elongated rectangular shape. The tip end portion 62a of the trailing shield 62 slightly protrudes from the ABS 13 of the slider 15.

The trailing shield 62 has a first connection portion 50 connected to the main magnetic pole 60. The first connection portion 50 is magnetically connected, via a non-conductor 52, to an upper part of the main magnetic pole 60, that is, a part of the main magnetic pole 60 away from the ABS 13. The first recording coil 70 is wound around the first connection portion 50 of the first magnetic core, for example. To write a signal on the magnetic disk 12, a recording current is made to flow through the first recording coil 70 to cause the first recording coil 70 to excite the main magnetic pole 60, so that a magnetic flux flows through the main magnetic pole 60.

The leading shield 64 made of a soft magnetic material is provided on the leading side of the main magnetic pole 60 to face the main magnetic pole 60. The leading shield 64 is formed in a substantially L shape, and a tip end portion 64a on the ABS 13 side is formed in an elongated rectangular shape. The tip end portion 64a slightly protrudes from the ABS 13 of the slider 15.

The leading shield 64 has a second connection portion 68 connected to the main magnetic pole 60 at a position away from the ABS 13. The second connection portion 68 is formed of, for example, a soft magnetic material, and is magnetically connected, via a non-conductor 69, to the upper part of the main magnetic pole 60, that is, a part of the main magnetic pole 60 away from the ABS 13. As a result, the second connection portion 68 forms a magnetic circuit together with the main magnetic pole 60 and the leading shield 64. The second recording coil 72 of the write head 58 is wound, for example, around the second connection portion 68, and applies a magnetic field to this magnetic circuit.

As described above, the tip end portion 60a of the main magnetic pole 60, the tip end portion 62a of the trailing shield 62, and the tip end portion 64a of the leading shield 64 slightly protrude from the ABS 13 to form a second protrusion PH2. A protrusion height (protrusion amount) of the tip end portion 62a of the trailing shield 62 and the tip end portion 64a of the leading shield from the ABS 13 is about 4 nm. The tip end portion 60a of the main magnetic pole 60 protrudes beyond the tip end portion 62a of the trailing shield 62 and the tip end portion 64a of the leading shield 64. The protrusion height (protrusion amount) of the main magnetic pole 60 from the tip end portions 62a and 64a is set to, for example, about 0.3 nm to 1 nm.

As illustrated in FIG. 3, a plurality of connection terminals 43 are provided at the trailing end 15b of the slider 15. The first recording coil 70 and the second recording coil 72 are each connected to the connection terminals 43 through wires, and are further connected to the head amplifier IC 30 through the flexure 28. When a signal is written on the magnetic disk 12, a recording current is made to flow from the recording current supply circuit 32 of the head amplifier IC 30 to the first recording coil 70 and the second recording coil 72 so that the main magnetic pole 60 is excited to cause a magnetic flux to flow through the main magnetic pole 60. The recording current to be supplied to the first recording coil 70 and the second recording coil 72 is controlled by the main controller 40.

The magnetoresistive effect element 55 of the read head 54 is connected to the connection terminals 43 through wires (not illustrated), and is further connected to the head amplifier IC 30 through the flexure 28. The signal read by the read head 54 is amplified by the head amplifier IC 30 and is sent to the main controller 40.

The first heater 76a and the second heater 76b are each connected to the connection terminals 43 through wires, and are further connected to the head amplifier IC 30 through the flexure 28. By applying a drive power to the first heater 76a and the second heater 76b from the first heater power supply circuit 34a and the second heater power supply circuit 34b of the head amplifier IC 30 so as to heat the heaters and a periphery of the heaters, it is possible to cause the write head 58 or the read head 54 to bulge toward the magnetic disk 12. The drive power supplied to the first heater 76a and the second heater 76b is controlled by the heater power control unit 46a of the main controller 40.

The contact sensor CS is connected to the connection terminals 43 through wires, and is further electrically connected to the head amplifier IC 30 and the main controller 40 through the flexure 28. The contact sensor CS detects contact between the head portion 17 and the magnetic disk 12, based on a change in resistance, and sends a detection signal to the main controller 40.

Figure 4:
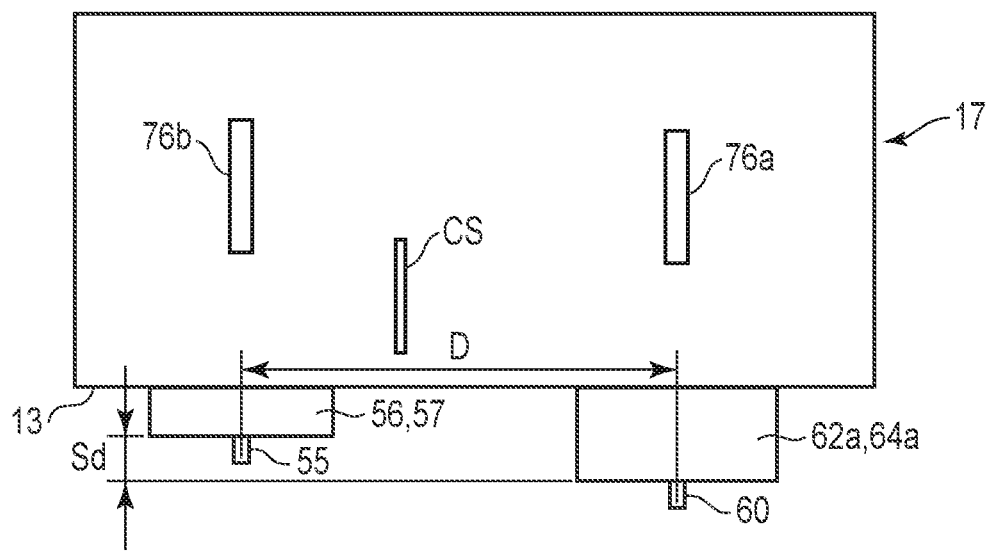
FIG. 4 is a side view schematically illustrating the head portion.
Figure 5:
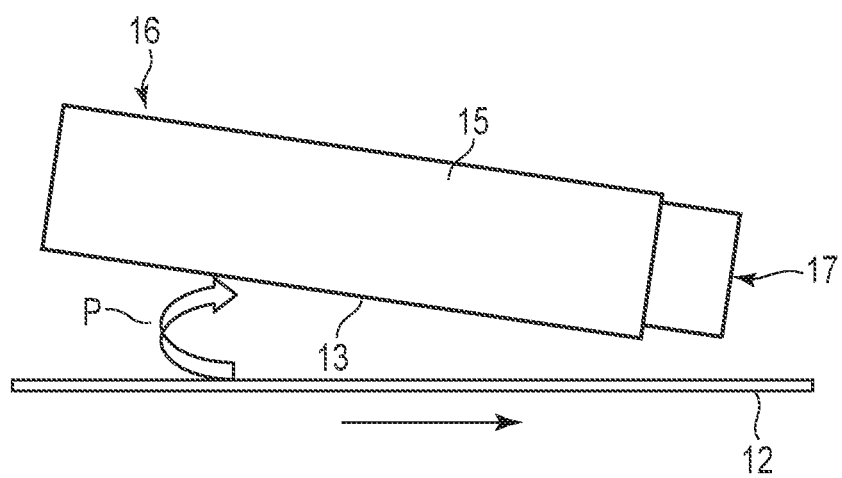
FIG. 5 is a side view schematically illustrating the magnetic head when flying.
Figure 6:
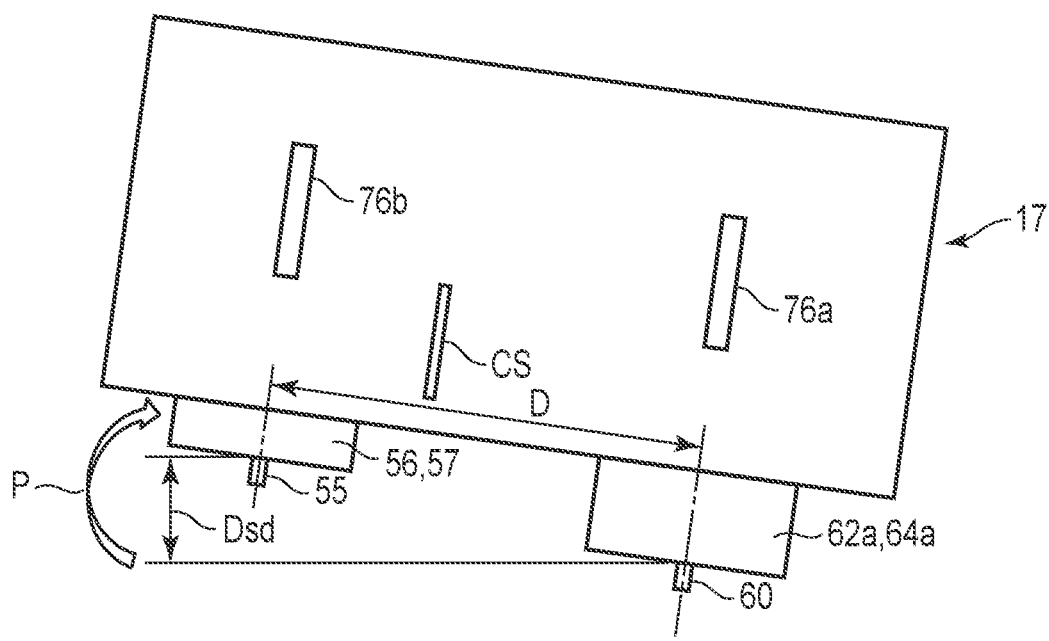
FIG. 6 is a side view schematically illustrating the above-described head portion when flying.

FIG. 4 is a side view schematically illustrating the head portion 17 of the magnetic head, FIG. 5 is a side view schematically illustrating the magnetic head 16 when flying, and FIG. 6 is a side view schematically illustrating the head portion 17 of the magnetic head when flying.

As illustrated in FIG. 4, regarding the head portion 17 before flying, a distance between the read element 55 and the write element (main magnetic pole 60) in a direction parallel to the ABS 13 is D, and a difference in height between protrusion ends of the first and second magnetic shield films 56 and 57 in the read head and the protrusion ends of the shields 62a and 62b in the write head (a difference in height in the direction perpendicular to the magnetic disk surface) is referred to as a step delta (Sd).

As illustrated in FIG. 5, when the HDD is operating, the magnetic head 16 and the slider 15 are kept flying above the surface of the magnetic disk 12 by a predetermined amount by an air flow generated between the disk surface and the ABS 13 due to the rotation of the magnetic disk 12. When the magnetic head 16 is flying, the ABS 13 of the slider 15 is inclined by a flying pitch (flying pitch angle) P with respect to the surface of the magnetic disk 12.

As illustrated in FIG. 6, regarding the head portion 17 in which the flying pitch P occurs, the difference in height between the protrusion ends of the first and second magnetic shield films 56 and 57 in the read head and the protrusion ends of the shields 62a and 62b in the write head (the difference in height in the direction perpendicular to the magnetic disk surface) is referred to as a dynamic step delta (Dsd). Assuming that the ambient temperature is T, the position in the radial direction (radial position) of the magnetic head on the magnetic disk is R, and the flying pitch angle is θ, Dsd is expressed by the equation $Dsd=Sd(T)+D\cdot\theta(R, T)$. That is, Dsd fluctuates depending on the ambient temperature T and the radial position R.

Figure 7:
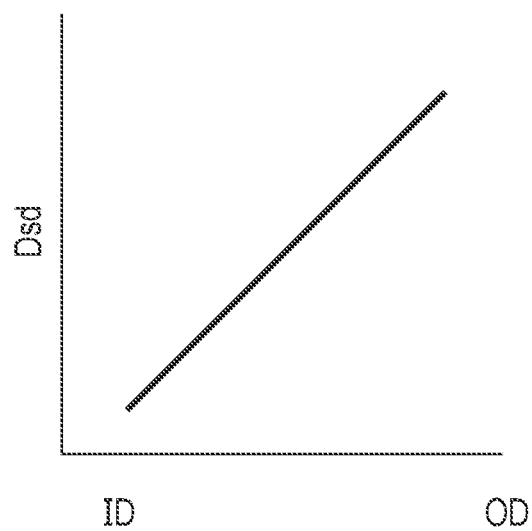
FIG. 7 is a diagram illustrating a relationship between a position in a radial direction (radial position) of the magnetic head on a magnetic disk and a dynamic step delta (Dsd).

FIG. 7 is a diagram illustrating a relationship between the radial position of the magnetic head and Dsd. As illustrated in the drawing, it can be seen that Dsd increases as the magnetic head 16 moves from the inner diameter ID to the outer diameter OD side of the magnetic disk 12. It can be seen that the flow velocity of the air flow increases toward the outer diameter side of the magnetic disk 12 and the flying height of the magnetic head 16 increases, so that Dsd increases.

Figure 8:
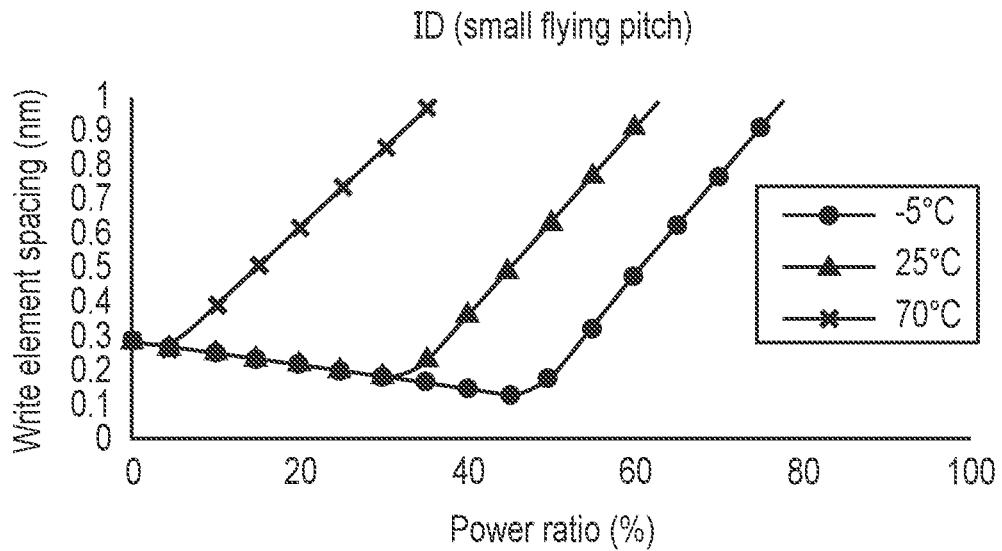
FIG. 8 is a diagram illustrating a relationship between a ratio of drive power supplied to a first heater and a second heater (power ratio) and the flying height (spacing) of a write head during a write operation when a magnetic head is located on an inner diameter (ID) of the magnetic disk under each of the following environments: low temperature (−5° C.), normal temperature (25° C.), and high temperature (70° C.)
Figure 9:
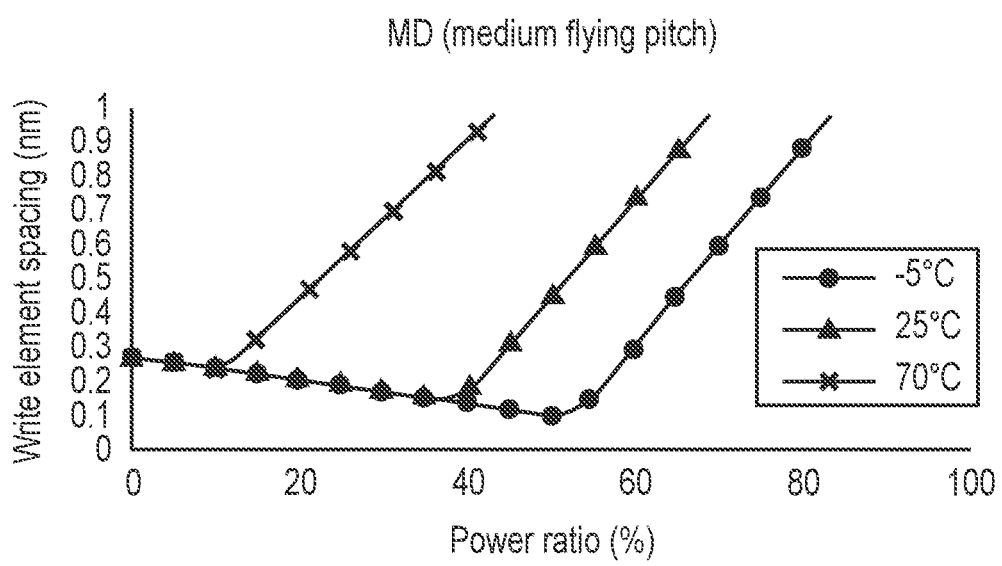
FIG. 9 is a diagram illustrating the relationship between the ratio of the drive power supplied to the first heater and the second heater (power ratio) and the flying height (spacing) of the write head during the write operation when the magnetic head is located on a middle diameter (MD) of the magnetic disk under each of the following environments: low temperature (−5° C.), normal temperature (25° C.), and high temperature (70° C.)
Figure 10:
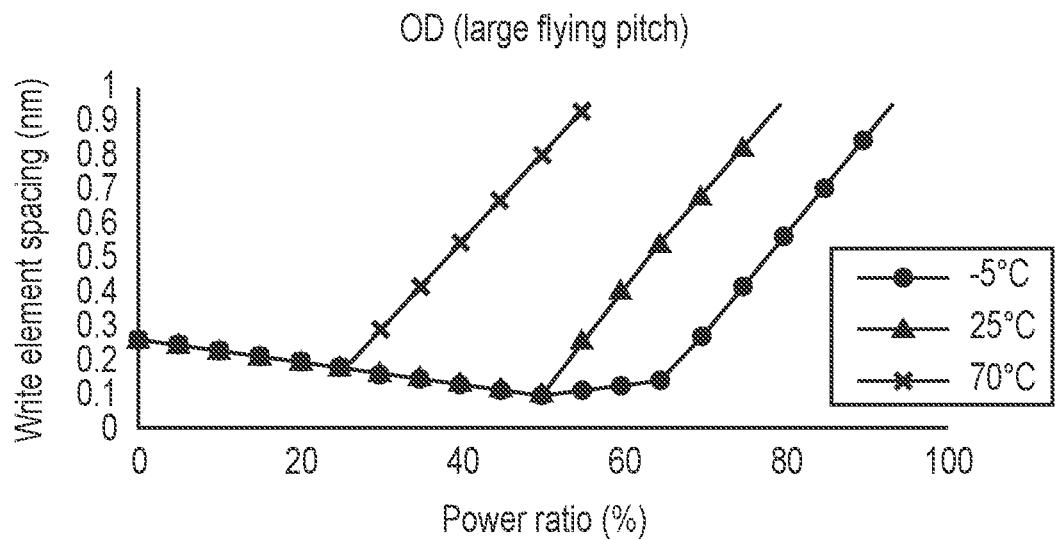
FIG. 10 is a diagram illustrating the relationship between the ratio of the drive power supplied to the first heater and the second heater (power ratio) and the flying height (spacing) of the write head during the write operation when the magnetic head is located on an outer diameter (OD) of the magnetic disk under each of the following environments: low temperature (−5° C.), normal temperature (25° C.), and high temperature (70° C.)

FIGS. 8, 9, and 10 illustrate a relationship between a ratio of the drive power supplied to the first heater and the second heater (power ratio) and the flying height (spacing) of the write head during the write operation when the magnetic head is at different radial positions (FIG. 8: located on the inner circumference (ID) of the magnetic disk, FIG. 9: located on the middle diameter (MD) of the magnetic disk, and FIG. 10: located on the outer diameter (OD) of the magnetic disk) under each environment of low temperature (−5° C.), normal temperature (25° C.), and high temperature (70° C.)

Figure 11:
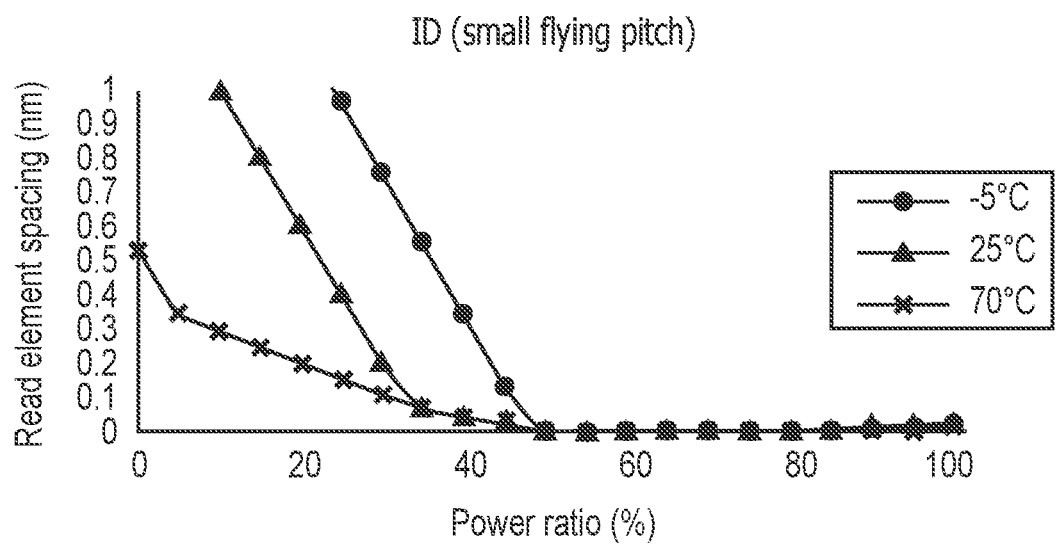
FIG. 11 is a diagram illustrating the relationship between the ratio of the drive power supplied to the first heater and the second heater (power ratio) and the flying height (spacing) of the read head during a read operation when the magnetic head is located on the inner diameter (ID) of the magnetic disk under each of the following environments: low temperature (−5° C.), normal temperature (25° C.), and high temperature (70° C.)
Figure 12:
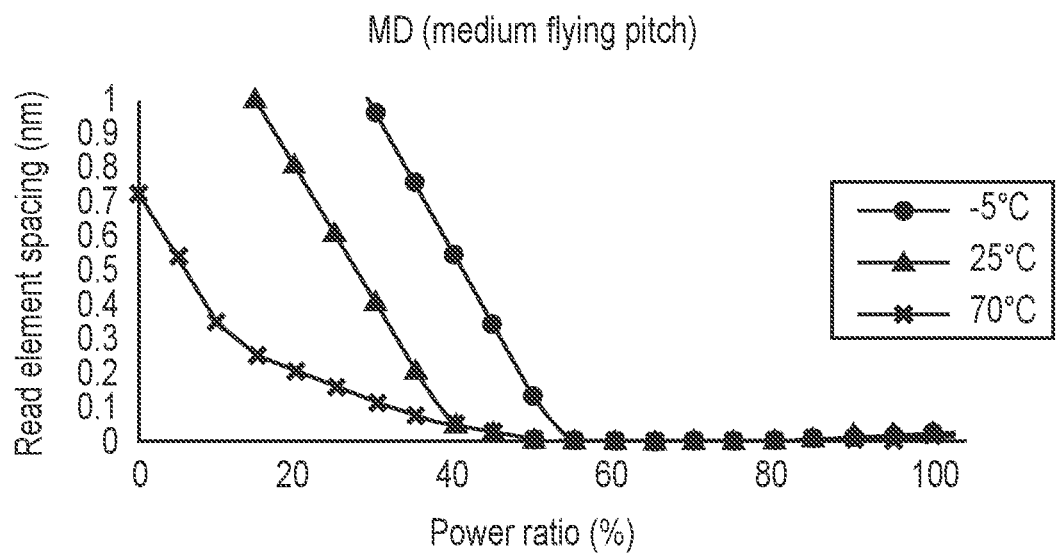
FIG. 12 is a diagram illustrating the relationship between the ratio of the drive power supplied to the first heater and the second heater (power ratio) and the flying height (spacing) of the read head during the read operation when the magnetic head is located on the middle diameter (MD) of the magnetic disk under each of the following environments: low temperature (−5° C.), normal temperature (25° C.), and high temperature (70° C.)
Figure 13:
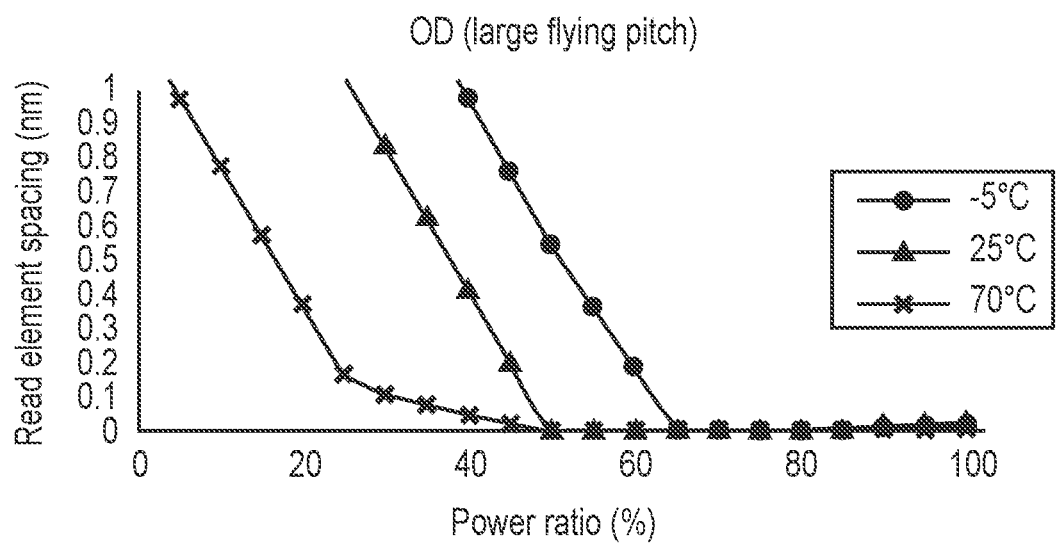
FIG. 13 is a diagram illustrating the relationship between the ratio of the drive power supplied to the first heater and the second heater (power ratio) and the flying height (spacing) of the read head during the read operation when the magnetic head is located on the outer diameter (OD) of the magnetic disk under each of the following environments: low temperature (−5° C.), normal temperature (25° C.), and high temperature (70° C.).

FIGS. 11, 12, and 13 illustrate a relationship between the ratio of the drive power supplied to the first heater and the second heater (power ratio) and the flying height (spacing) of the read head during the read operation when the magnetic head is at different radial positions (FIG. 11: located on the inner diameter (ID) of the magnetic disk, FIG. 12: located on the middle diameter (MD) of the magnetic disk, and FIG. 13: located on the outer diameter (OD) of the magnetic disk) under each environment of low temperature (−5° C.), normal temperature (25° C.), and high temperature (70° C.)

In the present embodiment, the power ratio (PR) indicates a ratio of the drive power supplied to the second heater 76b adjacent to the read head 55 to a total drive power supplied to the first heater 76a and the second heater 76b. For example, when the power ratio is 25%, 25% of the total drive power is supplied to the second heater 76b, and the remaining 75% is supplied to the first heater 76a.

As illustrated in FIGS. 8, 9, and 10, during the write operation, the flying height (spacing) of the write head tends to increase as the ambient temperature rises (from −5° C. to 25° C. to 70° C.) at each radial position. For example, when comparison is made with the flying height for the power ratio of 25% for the write operation, the flying height (spacing) of the write head is about 0.2 nm at normal temperature and is appropriate, but the flying height significantly increases to about 0.8 nm at the high temperature. This is because a region between the write head and the read head excessively bulges due to the temperature rise. It can be seen that the power ratio needs to be lowered in order to set the write head at the lowest point at high temperatures.

Further, in any of the temperature environments, the flying height of the write head tends to decrease as the radial position of the magnetic head 16 moves from the inner diameter ID to the outer diameter OD. Therefore, it can be seen that it is necessary to increase the power ratio as the magnetic head moves to the outer diameter OD in order to set the write head at the lowest point during the write operation.

As illustrated in FIGS. 11, 12, and 13, the flying height (spacing) of the read head tends to decrease as the ambient temperature rises (from −5° C. to 25° C. to 70° C.) at each radial position during the read operation. For example, comparison is made with the flying height for the power ratio of 30% for the read operation, the flying height (spacing) of the read head is about 0.2 nm at normal temperature and is appropriate, but the flying height decreases to about 0.1 nm at the high temperature. It can be seen that it is necessary to lower the power ratio in accordance with the increase in the ambient temperature in order to appropriately maintain the flying height of the read head.

Further, in any of the temperature environments, the flying height of the read head tends to increase as the radial position of the magnetic head moves from the inner diameter ID to the outer diameter OD. Therefore, it can be seen that it is necessary to increase the power ratio as the magnetic head moves to the outer diameter OD in order to set the read head at the lowest point during the read operation.

In the present embodiment, in order to achieve a high recording density, the main controller 40 controls the flying height (magnetic spacing) of the magnetic head so that the write element (main magnetic pole) 60 is at the lowest point during the write operation and the read element 55 is at the lowest point during the read operation by adjusting the power ratio of the heater drive power supplied to the first heater 76a and the second heater 76b. At this time, as described above, when the ambient temperature rises, the head element portion, particularly, a read element portion expands due to heat, and thus, the step delta Sd changes as compared with that at normal temperature. In addition, the flying pitch depends on the radial position at which the magnetic head is operated, and the dynamic step delta Dsd increases as the flying pitch increases. Therefore, according to the present embodiment, the main controller 40 performs control such that, by changing the power ratio (PR), depending on the change in the ambient temperature, Dsd for normal temperature is maintained as it is so that the write element portion is located at the lowest point. In addition, the main controller 40 appropriately maintains the flying height of the write element portion and the read element portion at any radial position by controlling the power ratio (PR), depending on the radial position of the magnetic head.

FIG. 14 illustrates an example of the power ratio setting table. According to the present embodiment, the memory 47 of the main controller 40 stores Power ratio setting table 1, in which the following relationships illustrated in FIG. 14 are tabulated: a relationship between the ambient temperature and an optimum power ratio; and a relationship between the radial position of the magnetic head and the optimum power ratio. Power ratio setting table 1 is prepared in such a manner that, after the flying heights (spacings) of the write head and the read head with respect to the power ratio are measured offline for each temperature or each radial position as shown in above FIGS. 8 to 13, the measurement data tabulated and stored. In Power ratio setting table 1, PR indicates the power ratio, and Zn indicates the radial position (track of the magnetic disk). The value Zn: 31 corresponds to the innermost circumferential position of the magnetic disk, and Zn: 0 corresponds to the outermost diameter position of the magnetic disk.

The heater power control unit 46a of the main controller 40 selects the optimum power ratio corresponding to the temperature detected by the temperature sensor TS, based on Power ratio setting table 1, and sets a first power to be supplied to the first heater 76a and a second power to be supplied to the second heater 76b, depending on the selected power ratio. Similarly, the heater power control unit 46a selects the optimum power ratio corresponding to the radial position of the magnetic head detected by the head amplifier IC, based on Power ratio setting table 1, and sets the first power to be supplied to the first heater 76a and the second power to be supplied to the second heater 76b, depending on the selected power ratio.

A description will be given on an example of a flying height control performed, by the main controller 40, depending on the ambient temperature.

Figure 15:
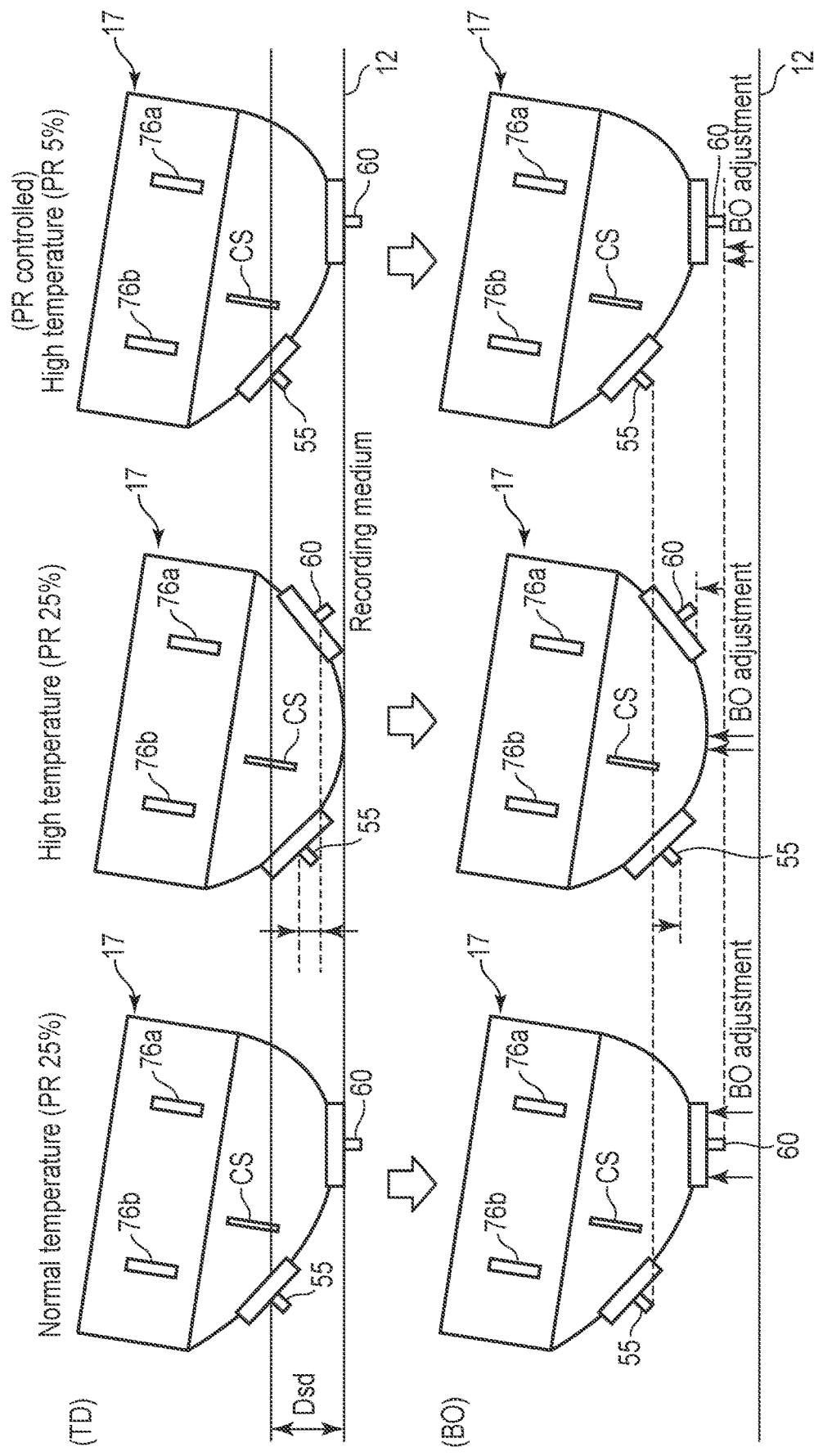
FIGS. 15A, 15B, and 15C are side views each schematically illustrating an example of a touch down (TD) operation and a flying height adjustment operation (BO) of the magnetic head during a write operation.

FIGS. 15A to 15C are side views schematically illustrating a touch down (TD) operation and a flying height adjustment operation (BO) of the magnetic head during the write operation.

As illustrated in FIG. 15A, in a state where the magnetic head 16 is located at the radial position ID (Zn: 31) at normal temperature (for example, 25° C.), the heater power control unit 46a selects the power ratio of 25% corresponding to the normal temperature from Power ratio setting table 1, and sets the first power to be supplied to the first heater 76a and the second power to be supplied to the second heater 76b, depending on the selected power ratio. The set first power and second power are supplied from the first heater power supply circuit 34a and the second heater power supply circuit 34b to the first heater 76a and the second heater 76b. As a result, the read head, the write head, and the peripheral part thereof are heated and expanded. The write element 60 bulges to the lowest point on the magnetic disk 12 side, and the read element 55 bulges to a position away from the write element 60 by Dsd.

In the touch operation, the heater power control unit 46a increases the first power and the second power, while maintaining the power ratio of 25%, so as to increase bulging amounts of the write head and the read head, and thus brings the write head into contact (touch) with the magnetic disk 12. During this step time, when the thermal contact sensor CS is warmed up by being energized from the main controller 40, a temperature of the thermal contact sensor CS decreases as the thermal contact sensor CS gets closer to the magnetic disk 12, and an AC component of the energization generates a contact vibration when the write shield 62a comes into contact with the magnetic disk 12. That is, when the write shield 62a comes into contact with the magnetic disk 12, the thermal contact sensor CS outputs the contact vibration to the main controller 40 as a detection signal output. As a result, the main controller 40 can detect that the write element 60 has come into contact with the magnetic disk 12, and can accurately detect a first power value and a second power value at the time of contact.

As illustrated in FIG. 15A, after the touch operation has completed, the main controller 40 adjusts the flying height adjustment (BO) of the magnetic head, based on the first power value and the second power value at the time of contact. The main controller 40 sets the write element 60 at a desired flying height by lowering the first power and the second power by a predetermined amount, based on the power value at the time of contact.

As illustrated in FIG. 15B, when the ambient temperature rises to a high temperature (for example, 70° C.), if the power ratio is set to 25%, which is the same as the power ratio at normal temperature, the read element 55 part expands due to heat, so that Dsd decreases, and the middle part between the write element 60 and the read element 55 is located at the lowest point. Therefore, the flying height (spacing) of the write element 60 becomes larger than the flying height at normal temperature, and there arises a concern about loss of an areal density capability (ADC). In addition, the flying height of the read element 55 part becomes smaller than at normal temperature, and there arises a concern about reliability such as wear and head deterioration.

To address this issue, in the present embodiment, as illustrated in FIG. 15C, the heater power control unit 46a of the main controller 40 changes the power ratio, depending on the temperature rise, and sets the power ratio suitable for high temperature. That is, when the temperature detected by the temperature sensor TS becomes 70° C. in a state where the magnetic head 16 is located at the radial position ID (Zn: 31), the heater power control unit 46a selects the power ratio of 5% corresponding to the high temperature (70° C.) from Power ratio setting table 1, and sets the first power to be supplied to the first heater 76a and the second power to be supplied to the second heater 76b, depending on the selected power ratio. The set first power and second power are supplied from the first heater power supply circuit 34a and the second heater power supply circuit 34b to the first heater 76a and the second heater 76b.

As described above, by lowering the power ratio PR from 25% to 5% in a high-temperature environment, it is possible to adjust the flying height so that the write element 60 is located at the lowest point while maintaining the dynamic step delta Dsd for normal temperature as it is. By changing the power ratio, it is possible to keep the flying heights (spacings) of both the write element 60 and the read element 55 unchanged from normal temperature.

In a similar manner, during the read operation, the heater power control unit 46a of the main controller 40 selects, depending on the temperature detected by the temperature sensor TS, a power ratio corresponding to the temperature from Power ratio setting table 1, and sets the first power to be supplied to the first heater 76a and the second power to be supplied to the second heater 76b, depending on the selected power ratio. For example, when the ambient temperature changes from the normal temperature of 25° C. to the high temperature of 70° C., the heater power control unit 46a selects the power ratio of 5% corresponding to the high temperature of 70° C. from Power ratio setting table 1, and changes the power ratio from 25% to 5%.

In this manner, control is performed such that the dynamic delta Dsd for normal temperature is maintained as it is so that the read element portion is located at the lowest point. By changing the power ratio, it is possible to keep the flying heights (spacings) of both the read element 55 and the write element 60 unchanged from the flying heights at normal temperature.

During each of the write operation and the read operation, the heater power control unit 46a may change the power ratio, depending on the radial position of the magnetic head. In the present embodiment, the power ratio (PR) is changed depending on the temperature change and the change in the radial position, and control is performed so as to appropriately maintain the flying heights of the write element and the read element.

The heater power control unit 46a selects, depending on the radial position of the magnetic head detected by the head amplifier IC, the power ratio corresponding to the radial position from Power ratio setting table 1, and sets the first power to be supplied to the first heater 76a and the second power to be supplied to the second heater 76b, based on the selected power ratio. For example, when the radial position of the magnetic head moves from the innermost diameter (ID) to the outermost diameter (OD) in the state of normal temperature, the heater power control unit 46a selects the power ratio of 45% corresponding to the outermost diameter (Zn: 0) from Power ratio setting table 1, and changes the power ratio from 25% to 45%.

By the above control, even when the magnetic head is located on either the inner diameter side ID or the outer diameter side OD, the flying heights (spacings) of the write element and the read element can be maintained at predetermined appropriate values, and the dynamic step delta Dsd can be maintained.

Next, a description will be given on a configuration example in which the flying height (spacing) of the contact sensor CS is controlled, depending on the ambient temperature and/or the radial position of the magnetic head.

Figure 16:
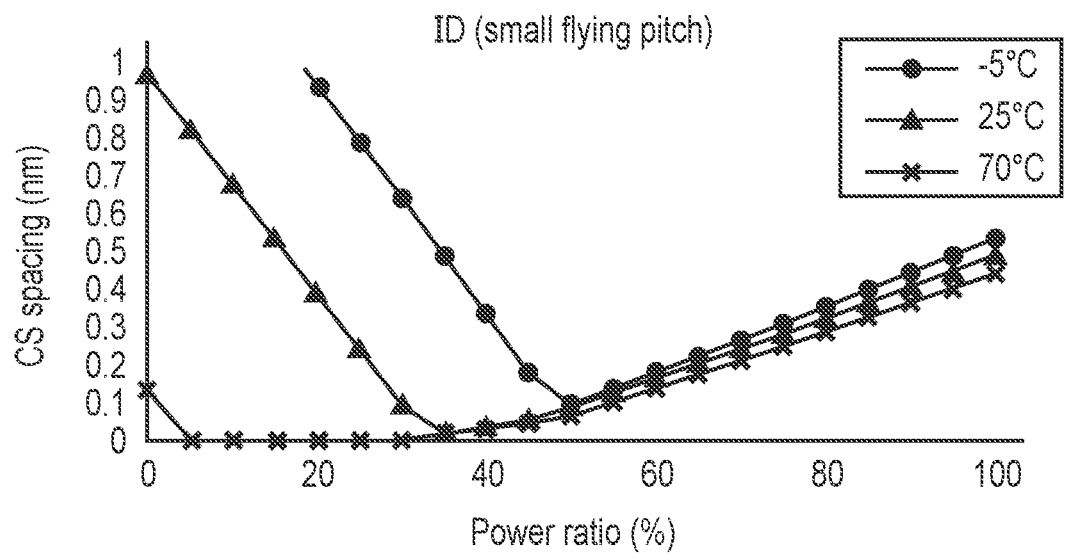
FIG. 16 is a diagram illustrating the relationship between the ratio of the drive power supplied to the first heater and the second heater (power ratio) and the flying height (spacing) of a contact sensor CS during the write operation when the magnetic head is located on the inner diameter (ID) of the magnetic disk under each of the following environments: low temperature (−5° C.), normal temperature (25° C.), and high temperature (70° C.)
Figure 17:
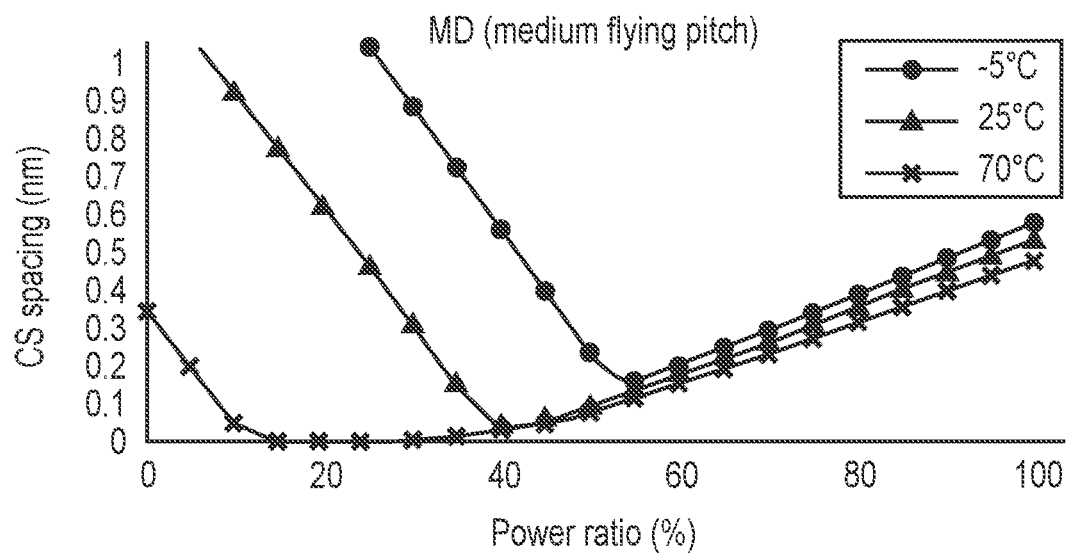
FIG. 17 is a diagram illustrating the relationship between the ratio of the drive power supplied to the first heater and the second heater (power ratio) and the flying height (spacing) of the contact sensor CS during the write operation when the magnetic head is located on the middle diameter (MD) of the magnetic disk under each of the following environments: low temperature (−5° C.), normal temperature (25° C.), and high temperature (70° C.)
Figure 18:
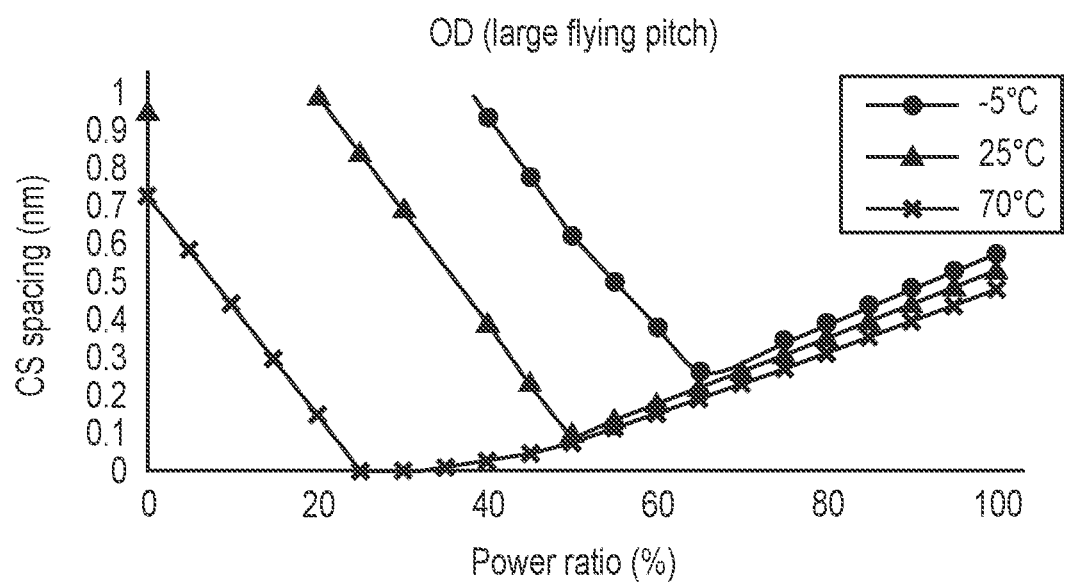
FIG. 18 is a diagram illustrating the relationship between the ratio of the drive power supplied to the first heater and the second heater (power ratio) and the flying height (spacing) of the contact sensor CS during the write operation when the magnetic head is located on the outer diameter (OD) of the magnetic disk under each of the following environments: low temperature (−5° C.), normal temperature (25° C.), and high temperature (70° C.)

FIGS. 16, 17, and 18 illustrate results of the offline measurement of the relationship between the power ratio of the drive power supplied to the first heater and the second heater and the flying height (spacing) of the contact sensor CS during the write operation when the magnetic head is located at different radial positions (FIG. 16: located on the inner diameter (ID) of the magnetic disk, FIG. 17: located on the middle diameter (MD) of the magnetic disk, and FIG. 18: located on the outer diameter (OD) of the magnetic disk) under each environment of low temperature (−5° C.), normal temperature (25° C.), and high temperature (70° C.)

As illustrated in the drawing, at each radial position, the power ratio at which the flying height (spacing) of the contact sensor CS reaches the lowest point tends to decrease as the ambient temperature rises (from −5° C. to 25° C. to 70° C.). Therefore, it can be seen that the power ratio needs to be smaller than the power ratio in the normal temperature environment in order to control such that the flying height of the contact sensor CS is the smallest in the high temperature environment. Further, in any of the temperature environments, as the radial position of the magnetic head moves from the inner diameter ID to the outer diameter OD, the power ratio at which the flying height of the contact sensor CS is located at the lowest point tends to increase. Therefore, it can be seen that the power ratio needs to be increased as the magnetic head moves toward the side of the outer diameter OD.

According to the present embodiment, the heater power control unit 46a changes the power ratio to the appropriate value, depending on the changes in the ambient temperature and the radial position, and supplies the drive power to the first heater 76a and the second heater 76b, based on the changed power ratio. For example, when the touch detection is performed by the contact sensor CS at the inner diameter position (ID) under a temperature condition of 25° C., the heater power control unit 46a controls such that the power ratio is 25%, which is for normal temperature. When the touch detection is performed by the contact sensor CS at the outer diameter position (OD) under a temperature condition of 70° C., the heater power control unit 46a changes the power ratio to 35% to control the drive power.

As described above, by changing and controlling the power ratio (PR), depending on the changes in the ambient temperature and the radial position, it is possible to control such that the flying height (spacing) of the contact sensor CS is the smallest even under the conditions of different temperatures and radial positions and to maintain contact detection sensitivity of the contact sensor CS.

Next, a description will be given to a configuration example of controlling the power ratio (PR) of the heater drive power, depending on the pressure in the housing 11 of the HDD.

Figure 19:
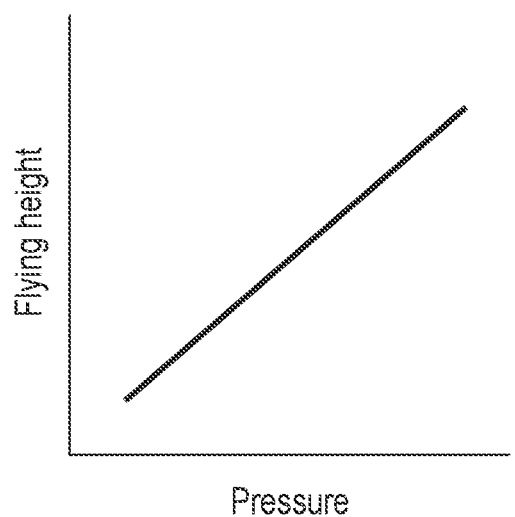
FIG. 19 is a diagram illustrating a relationship between a pressure in a housing and the flying height of the magnetic head.
Figure 20:
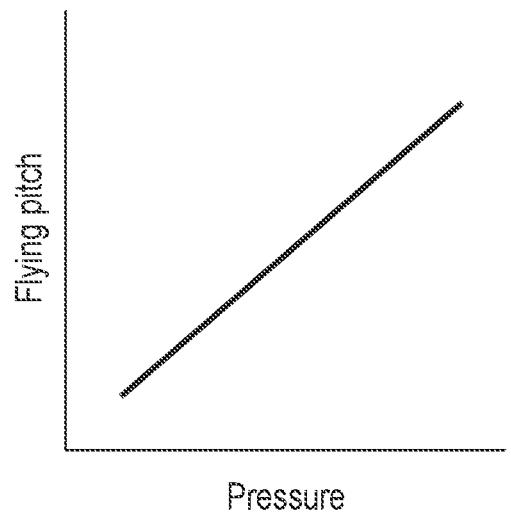
FIG. 20 is a diagram illustrating a relationship between the pressure in the housing and a flying pitch of the magnetic head.
Figure 21:
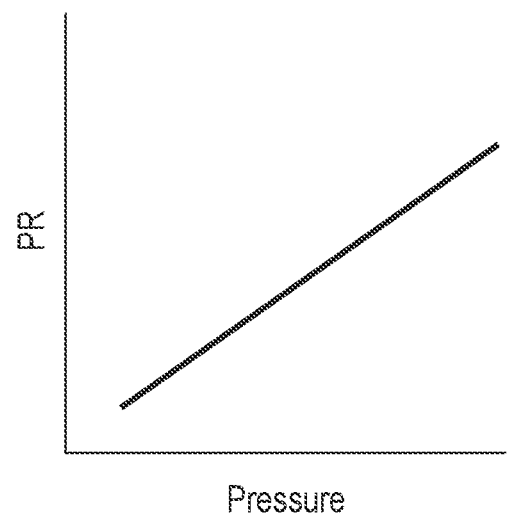
FIG. 21 is a diagram showing a relationship between the pressure in the housing 11 and the power ratio (PR).

FIG. 19 is a diagram illustrating a relationship between the pressure in the housing 11 and the flying height of the magnetic head, FIG. 20 is a diagram illustrating a relationship between the pressure in the housing 11 and the flying pitch of the magnetic head, and FIG. 21 is a diagram illustrating a relationship between the pressure in the housing 11 and the power ratio (PR).

As illustrated in FIG. 19, in an environment where an external pressure is high, an internal pressure of the housing 11 is also high, and the flying height of the magnetic head increases as the pressure increases. As illustrated in FIG. 20, as the pressure is higher, the flying pitch of the magnetic head is also higher, and the dynamic step delta Dsd is higher. Therefore, in order to keep Dsd constant, it can be seen that it is necessary to change the power ratio, depending on a change in the pressure.

Therefore, according to the present embodiment, the heater power control unit 46a of the main controller 40 changes and adjusts the power ratio (PR) of the drive power supplied to the first heater and the second heater, depending on the pressure detected by the pressure sensor PS. For example, as illustrated in FIG. 21, when the pressure increases, the heater power control unit 46a increases the power ratio (PR) to adjust the increase in Dsd, specifically, to reduce the increase in Dsd. Further, the main controller 40 reduces an increase in the flying height of the entire magnetic head by changing and adjusting the entire heater power. As a result, even when the pressure in the housing 11 changes, it is possible to appropriately maintain the flying heights (spacings) of the write element 60 and the read element 55.

Regarding an HDD in which a low density gas such as helium is enclosed, when gas leakage occurs, the internal pressure of the housing 11 decreases, so that the flying height of the magnetic head decreases and the flying pitch also decreases. In such a case, the heater power control unit 46a of the main controller 40 adjusts the flying pitch of the magnetic head, specifically, decreases Dsd by lowering the power ratio (PR), depending on the decrease in pressure. Further, the heater power control unit 46a reduces a decrease in flying height of the entire magnetic head by changing and adjusting the entire heater power, specifically, by increasing the entire heater power. As a result, even when the pressure in the housing 11 has decreased, it is possible to appropriately maintain the flying heights (spacings) of the write element 60 and the read element 55.

The control of the power ratio depending on the pressure change may be performed similarly to the above-described embodiment in such a manner that the memory 47 stores the power ratio setting table in which a relationship between the pressure and the optimum power ratio is tabulated and that the power ratio may be changed and set based on the power ratio setting table.

Next, a description will be given on a configuration example in which, in an HDD including a plurality of magnetic heads, the power ratio (PR) of the heater drive power is independently controlled depending on the temperature and/or the change in the radial position of the magnetic heads.

In the HDD having a plurality of magnetic heads, a variation in the step delta Sd of each magnetic head is caused in a manufacturing process. In the present embodiment, in order to suppress variations in the flying heights (spacings) of the write element 60 and the read element 55 due to the variation in the step delta Sd, the main controller 40 is configured to individually control the power ratio for each magnetic head.

FIG. 22 illustrates a power ratio setting table 2 in which the relationship between the ambient temperature and the optimum power ratio and the relationship between the radial position of the magnetic head and the optimum power ratio are tabulated for each magnetic head. Power ratio setting table 2 is prepared in such a manner that turning points (the power ratios PR at each of which the heights of the write element and the read element are the same) is measured for each magnetic head in an adjustment process before shipment of the HDD and that the measured data is tabulated and stored in the memory 47. In Power ratio setting table 2, PR indicates a power ratio, Zn indicates the radial position, and Hd: n (0 to n) indicates a magnetic head number.

The heater power control unit 46a of the main controller 40 selects, based on the detected temperature and radial position, the power ratio corresponding to the detected temperature and radial position from Power ratio setting table 2 for each magnetic head 16, and sets the heater drive power to the selected power ratio for each magnetic head.

The above-described example of a power ratio control enables the flying height (spacing) of each magnetic head to be appropriately maintained even when there is the variation in the step delta Sd among the plurality of magnetic heads 16.

Note that, in the present configuration example, in addition to the power ratio control depending on the changes in the temperature and the radial position, the control of the power ratio (RP) depending on the pressure change and the flying height control of the contact sensor CS, which are described above, may be performed for each magnetic head.

With the magnetic head and the HDD according to the first embodiment configured as described above, by changing the power ratio of the drive power, which is a control amount of the thermal actuator, depending on the change in the ambient temperature, the change in the radial position of the magnetic head, or the change in the pressure in the housing and by setting the optimum power ratio, the flying height at which the write element and the read element are at the lowest point can be maintained even under different temperature environments, radial positions, and different pressures, so that the write operation and the read operation can be performed without impairing the recording density. As a result, the recording density can be improved in any environment, and the magnetic head can be prevented from being worn and damaged, so that reliability can be improved.

In the first embodiment, the power ratio is changed depending on the change in the ambient temperature, the change in the radial position of the magnetic head, or the change in the pressure in the housing. However, the present invention is not limited to this configuration, and the power ratio may be controlled depending on at least one of the above changes. Also in the above configuration, it is possible to appropriately control the flying heights of the write element and the read element as compared with the case where the power ratio is not changed at all, and it is possible to improve the recording density and the reliability.

Second Embodiment

Next, a configuration of a head portion of an HDD according to a second embodiment will be described. In the second embodiment, the same components as those of the first embodiment described above are denoted by the same reference numerals as those of the first embodiment, and the detailed description thereof will be omitted or simplified.

Figure 23:
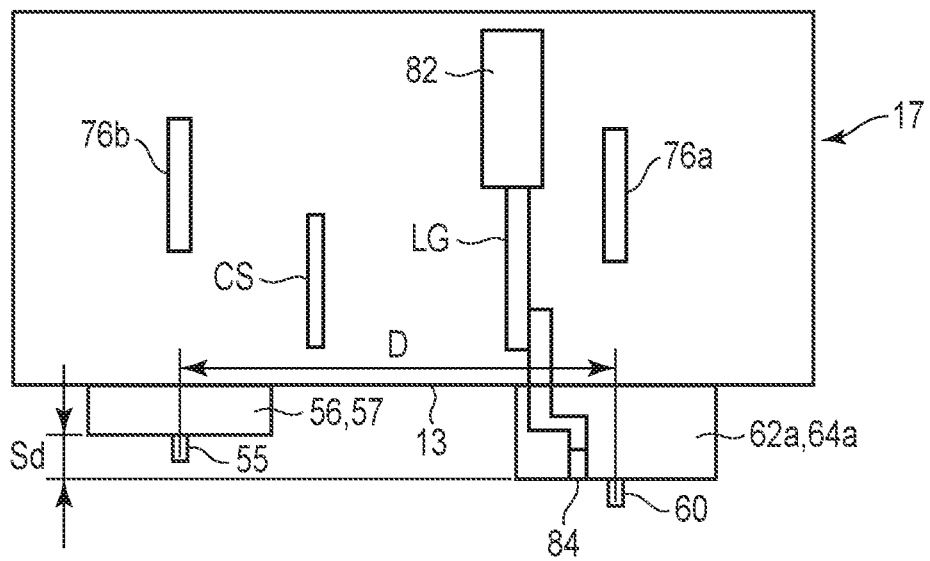
FIG. 23 is a side view schematically illustrating a head portion of a magnetic head according to a second embodiment.

FIG. 23 is a side view schematically illustrating a head portion 17 of a magnetic head according to the second embodiment.

According to the second embodiment, a magnetic head having a thermal assist function is used. As illustrated in the drawing, the head portion 17 further includes: a laser oscillator (laser diode) 82 embedded in the head portion 17; a near-field transducer element (NFT element) 84 embedded in the head portion and exposed from an ABS 13, for example, exposed from tip end surfaces of the write shields 62a and 64a; and a waveguide LG embedded in the head portion 17 and configured to guide laser light emitted from the laser diode 82 to the NFT element 84. The laser diode 82 is electrically connected to the laser drive current supply circuit 36 (see FIG. 1) of the head amplifier IC 30 via wires and a flexure (not illustrated).

When a drive current is supplied from the laser drive current supply circuit 36 to the laser diode 82, the laser diode 82 oscillates laser light, supplies the laser light to the NFT element 84 through the waveguide LG, thereby causing the NFT element 84 to generate near-field light. By locally heating the recording layer 103 of the magnetic disk 12 by the near-field light generated from the tip of the NFT element 84, a coercive force of the recording layer portion is reduced. A recording magnetic field from the main magnetic pole 60 is applied to a region where the coercive force is reduced to write a signal. As described above, by locally heating the recording layer 103 portion and writing a signal in the region where the coercive force is sufficiently reduced, high-density recording can be performed.

Other components of the magnetic head 16 are the same as the components of the magnetic head 16 in the first embodiment described above.

Figure 24:
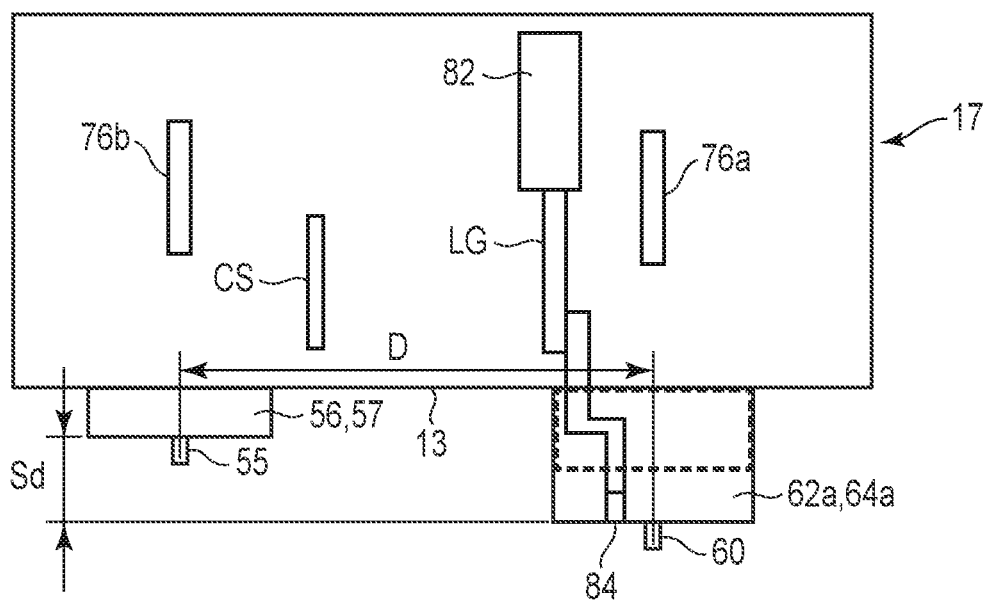
FIG. 24 is a side view schematically illustrating the head portion when a write head portion is thermally expanded.

FIG. 24 is a side view of the head portion schematically illustrating a state in which the write head portion is thermally expanded.

As illustrated in the drawing, under the condition where an input to the laser diode 82 is large, in other words, the thermal assist is large, the write head portion in the vicinity of the NFT element is thermally expanded due to an increase in temperature of the NFT element 84, and the step delta Sd therefore increases.

Figure 25:
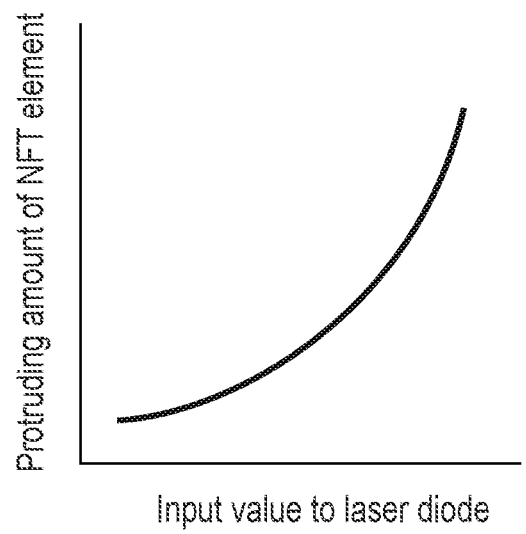
FIG. 25 is a diagram illustrating a relationship between an input value to a laser diode and a protruding amount of a near-field transducer (NFT) element.
Figure 26:
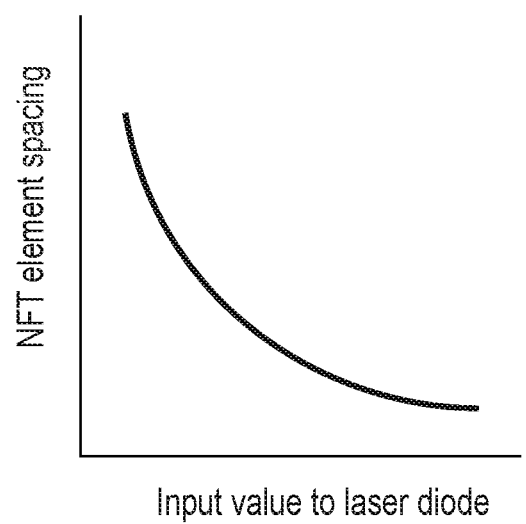
FIG. 26 is a diagram illustrating a relationship between the input value to the laser diode and a flying height (spacing) of the NFT element.
Figure 27:
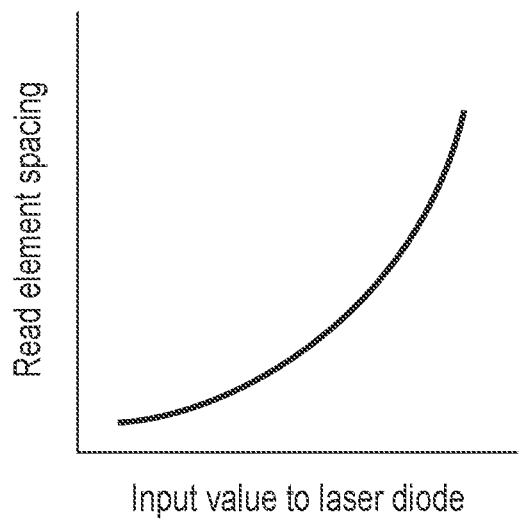
FIG. 27 is a diagram illustrating a relationship between the input value to the laser diode and the flying height (spacing) of the read element.
Figure 28:
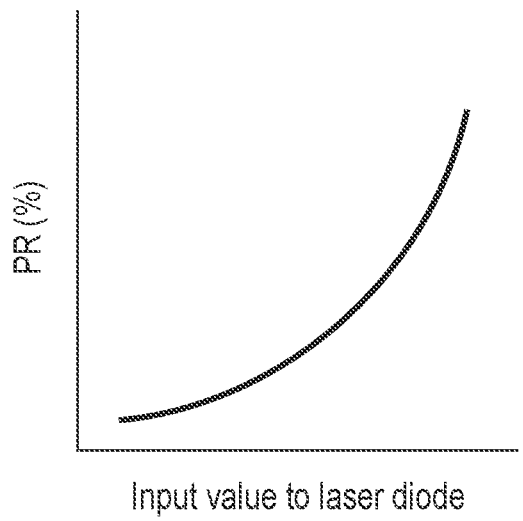
FIG. 28 is a diagram illustrating a relationship between the input value to the laser diode and the power ratio (PR) of a heater drive current.

FIG. 25 is a diagram illustrating a relationship between an input value to the laser diode 82 and a protruding amount of the NFT element 84, FIG. 26 is a diagram illustrating a relationship between the input value to the laser diode 82 and a flying height (spacing) of the NFT element 84, FIG. 27 is a diagram illustrating a relationship between the input value to the laser diode 82 and a flying height (spacing) of the read element 55, and FIG. 28 is a diagram illustrating a relationship between the input value to the laser diode 82 and the power ratio (PR) of the heater drive current.

It can be seen, as shown in FIGS. 25 and 26, that, with an increase in an input value to the laser diode 82, the protruding amount of the NFT element 84 increases and the flying height (spacing) of the NFT element 84 decreases. Further, it can be seen, as shown in FIG. 27, that, with the increase in the input value to the laser diode 82, the flying height (spacing) of the read element 55 increases. Therefore, in order to appropriately maintain the flying height of the NFT element 84, the write element 60, and the read element 55 during the write operation using the thermal assist function, it is preferable to perform control so as to increase the power ratio PR depending on the increase in the input value to the laser diode 82 as illustrated in FIG. 28.

A description will be given on an example of a flying height control performed, by the main controller 40, depending on the ambient temperature.

FIGS. 29A, 29B, and 29C are side views each schematically illustrating a touch down (TD) operation and a flying height adjustment operation (BO) of the magnetic head during a write operation.

As illustrated in FIG. 29A, according to the present embodiment, in a normal state (which is a state where the thermal assist function is not used), in order to suppress wear of the NFT element 84, the main controller 40 performs the touch operation and the flying height adjustment operation in a state where the power ratio (PR) is set to 35% so that the write head portion is not located at the lowest point.

As illustrated in FIG. 29B, when the thermal assist is performed, in other words, when the drive power is input to the laser diode 82, if the power ratio is set to 35%, which is the same value as in the normal state, the dynamic step delta Dsd increases due to thermal expansion of the NFT element 84 portion and the write element portion, so that a shield portion of the write head is located at the lowest point. In a case where the touch operation and the flying height adjustment operation are performed using the shield portion as a reference, the write element 60 and the NFT element 84 have a smaller flying height (spacing) than in the normal state, and there arises a concern about reliability. In contrast, since the dynamic step delta Dsd is increased, the read element 55 portion has a larger flying height than in the normal state; therefore, there arises a concern about quality degradation at the time of data reading.

To address this issue, according to the present embodiment, as illustrated in FIG. 29C, during the thermal assist, the main controller 40 performs the touch operation and the flying height adjustment operation in a state where the power ratio (PR) is changed from 35% to 45%, depending on the input value to the laser diode 82. By increasing the power ratio to 45%, the bulging amount of the read head portion increases, and the dynamic step delta Dsd can therefore be maintained at a value similar to Dsd in the normal state, whereby the flying heights of the write element, the NFT element, and the read element can be maintained at appropriate values.

The control of the power ratio depending on the input value to the laser diode 82 may be performed similarly to the above-described embodiment in such a manner that the memory 47 stores the power ratio setting table in which a relationship between the input value and the optimum power ratio is tabulated and that the power ratio may be changed and set based on the power ratio setting table.

With the magnetic head and the HDD configured as described above according to the second embodiment, the spacing (flying height) between the magnetic head 16 and the magnetic disk 12 can be appropriately maintained even during the thermal assist, and the recording density can therefore be improved. At the same time, it is possible to prevent wear and damage of the head portion and to thus improve a service life and reliability of the magnetic head.

The second embodiment may be applied in combination with the first embodiment described above. Specifically, the power ratio of the drive power supplied to the first heater and the second heater may be changed and adjusted based on a change in at least one of the ambient temperature, the radial position of the magnetic head, the pressure in the housing, and the input value to the laser diode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the write head of the magnetic head according to the embodiments can also be applied to a write head having no leading shield and/or side shield. In addition, the write head may be configured to include a high frequency oscillation element provided in the write gap. In addition, the material, shape, size, and the like of the elements constituting the head portion of the magnetic head can be changed as necessary. In the magnetic disk device, the number of magnetic disks and magnetic heads can be increased or decreased as necessary, and the size of the magnetic disk can be variously selected. In the magnetic head, the number of thermal actuators is not limited to two, and three or more thermal actuators may be provided.

What is claimed is:

1. A disk device comprising:
   a housing;
   a temperature sensor which detects a temperature in the housing;
   a magnetic disk rotatably provided in the housing;
   a magnetic head disposed in the housing to be movable in a radial direction of the magnetic disk, the magnetic head comprising: a write head that writes data on the magnetic disk, a read head that reads data on the magnetic disk, a first thermal actuator that controls an amount of protrusion of the write head, a second thermal actuator that controls an amount of protrusion of the read head, a laser oscillator, and a near-field transducer element that receives laser light oscillated from the laser oscillator and emits near-field light toward the magnetic disk;
   a power supply circuit which supplies first power to the first thermal actuator and supplies second power to the second thermal actuator;
   a drive current supply circuit that supplies a drive current to the laser oscillator; and
   a controller configured to adjust a power ratio between the first power and the second power, based on at least one of a change in temperature inside the housing and a change in a radial position of the magnetic head in the radial direction with respect to the magnetic disk, and the controller further configured to adjust the power ratio, based on a change in an input value of the drive current that is input to the laser oscillator.

2. The disk device of claim 1, further comprising a pressure sensor which detects a pressure in the housing,
   wherein the controller adjusts the power ratio, based on at least one of the change in the temperature in the housing, the change in the radial position, of the magnetic head, in the radial direction with respect to the magnetic disk, and a change in the pressure.

3. The disk device of claim 2, wherein the magnetic head comprises a contact sensor which detects contact between the magnetic disk and the magnetic head, and
   the controller adjusts the power ratio such that the contact sensor is located at a lowest position, based on at least one of the change in the temperature in the housing, the change in the radial position of the magnetic head in the radial direction with respect to the magnetic disk, and the change in the pressure.

4. The disk device of claim 1, wherein the controller comprises a memory storing a power ratio setting table in which a relationship between the temperature in the housing and an appropriate power ratio and a relationship between the radial position of the magnetic head and an appropriate power ratio are tabulated, and
   the controller selects, from the power ratio setting table, an appropriate power ratio corresponding to the temperature detected by the temperature sensor and the radial position of the magnetic head, and sets the power ratio.

* * * * *